United States Patent [19]

Kondo et al.

[11] Patent Number: 5,521,937
[45] Date of Patent: May 28, 1996

[54] MULTICARRIER DIRECT SEQUENCE SPREAD SYSTEM AND METHOD

[75] Inventors: Shiro Kondo, San Diego; Laurence B. Milstein, La Jolla, both of Calif.

[73] Assignee: InterDigital Technology Corporation, Wilmington, Del.

[21] Appl. No.: 133,254

[22] Filed: Oct. 8, 1993

[51] Int. Cl.$^6$ ............................ H04B 1/707; H04J 13/04
[52] U.S. Cl. ........................ 375/206; 375/200; 375/205; 380/34
[58] Field of Search ................. 375/1, 200–210; 380/34

[56] References Cited

U.S. PATENT DOCUMENTS

| | | | |
|---|---|---|---|
| 3,737,776 | 6/1973 | Fletcher et al. | 375/1 X |
| 4,041,391 | 8/1977 | Deerkoski | 375/1 X |
| 4,933,952 | 6/1990 | Albrieux et al. | 375/1 |
| 4,953,178 | 8/1990 | Ishigaki | 375/1 |
| 5,113,443 | 5/1992 | Brockman | 380/34 |
| 5,222,075 | 6/1993 | Richley | 375/1 |
| 5,278,826 | 1/1994 | Murphy et al. | 375/1 X |
| 5,319,672 | 6/1994 | Sumiya et al. | 375/1 |

*Primary Examiner*—Bernarr E. Gregory
*Attorney, Agent, or Firm*—David Newman & Associates

[57] ABSTRACT

A multicarrier direct sequence spread spectrum system and method. A maximal combiner is employed at the receiver for maximizing signal-to-noise ratio out of the receiver. The multicarrier system provides robustness against multipath fading, and narrowband interference suppression. The multicarrier system is suitable for a CDMA overlay scheme for PCN.

28 Claims, 6 Drawing Sheets

MULTICARRIER DIRECT SEQUENCE SPREAD SYSTEM AND METHOD

BACKGROUND OF THE INVENTION

1. Field of the Invention

The present invention relates to code division multiple access (CDMA) spread spectrum communications. More particularly, it relates to a communications system and method which exhibits not only robustness against multipath fading, but also allows overlaid narrowband interference suppression without use of a notch filter or a RAKE tapped delay line. These advantages are achieved by a multicarrier system with direct sequence spread spectrum modulation.

2. Description of the Related Art

A typical prior art spread spectrum system is shown in FIG. 1. Message data d(t) are processed by spread spectrum data modulator 51 using a spreading-sequence signal $g_1(t)$ to generate a spread-data signal. The spread-data signal is processed by a spread spectrum transmitter 52 using a carrier signal at a carrier frequency $f_o$, and transmitted using suitable techniques as a spread spectrum signal over a communications channel 53. As used herein, the term "spreading-sequence signal" refers to a signal $g_1(t)$ having a sequence of chips, which is used for spreading the spectrum of the data signal d(t). As is well-known in the art, the chip rate of the spreading-sequence signal is the rate at which the bits of data of signal d(t) are chopped into chips. Typically, the spreading-sequence signal $g_1(t)$ includes a pseudonoise (PN) sequence. The term "spread spectrum signal" refers to a spread-data signal modulated at the carrier frequency.

At a receiver, a spread spectrum demodulator 54 despreads the received spread spectrum signal to generate a modulated data signal, and the message data are recovered by a synchronous data demodulator 60 as received data. The synchronous data demodulator 60 uses a reference signal for synchronously demodulating the despread spread spectrum signal. A square-law device 55, bandpass filter 56 and frequency divider 57, which are well-known in the art, generate a reference signal from the received modulated data signal. A Costas Loop or other reference signal generating circuit can also provide a reference signal.

A spread spectrum system has desirable characteristics such as multiple access capability, robustness against multipath fading, and antijamming capability. In addition, various techniques have been proposed to further enhance system performance over and above that offered by the processing gain associated with a spread spectrum system. For example, a RAKE receiver shows enhanced performance in the presence of frequency selective fading, and a notch filter can be used to reject strong narrowband interference.

Spread spectrum modulation allows code division multiplex (CDM) and code division multiple access (CDMA) by permitting a plurality of users to transmit and receive on the same carrier frequency $f_o$ over communications channel 53. In CDMA, each user is provided with an individual and distinctive spreading sequence for generating a spreading-sequence signal. The spreading sequences preferably are orthogonal, and typically are almost uncorrelated with one another. Since each user transmits on the same carrier frequency, the spectrum from each user overlaps. While spread spectrum modulation allows efficient use of the spectrum, a need exists for a system and method which is even more robust against multipath fading than previously existing techniques while allowing interference suppression so that the CDMA system can overlay conventional narrowband waveforms.

SUMMARY OF THE INVENTION

A general object of the invention is to provide a multicarrier spread spectrum system with robustness against multipath fading and having narrowband interference suppression.

According to the present invention, as embodied and broadly described herein, a spread spectrum system for transmitting a data signal over a communications channel is provided which comprises a transmitter and a receiver. The transmitter includes a spread spectrum processing device, a plurality of carrier-product devices and a combiner. The spread spectrum processing device direct-sequence processes the data signal with a spreading-sequence signal to produce a spread-data signal as an output.

The plurality of carrier-product devices multiplies the spread-data signal with a plurality of carrier signals. Each carrier signal has a carrier frequency different from the carrier frequencies of the other carrier signals and is orthogonal to the other carrier signals. The plurality of carrier-product devices generates a plurality of spread spectrum signals, respectively, from the spread-data signal. The combiner combines the plurality of spread spectrum signals to form a multicarrier spread spectrum signal and the combined signal is sent over the communications channel using suitable techniques.

The receiver includes a despreading device, a plurality of correlators and a maximal-ratio combiner. The despreading device despreads the multicarrier spread spectrum signal as a plurality of modulated-data signals. Each modulated-data signal is modulated with a respective carrier signal of a plurality of carrier signals and respectively integrated by the plurality of correlators to form a plurality of estimate signals. That is, the plurality of correlators correlates the plurality of modulated-data signals with a replica of the plurality of carrier signals, respectively. After integration, each of the correlators outputs a respective estimate signal of the data signal. The maximal-ratio combiner then combines the estimate signals from each of the correlators to form a received-data signal.

The present invention also provides a method for transmitting a data signal over a communications channel. The method includes the steps of direct-sequence processing the data signal with a spreading-sequence signal to generate a spread-data signal. The spread-data signal is then multiplied by a first carrier signal at a first carrier frequency to produce a first spread spectrum signal. The spread-data signal is also multiplied with a second carrier signal at a second carrier frequency to produce a second spread spectrum signal. The second carrier frequency is different from the first carrier frequency and the second carrier signal is orthogonal to the first carrier signal. The first spread spectrum signal is subsequently combined with the second spread spectrum signal and sent as a multicarrier spread spectrum signal over the communications channel.

The method includes despreading the multicarrier spread spectrum signal to form a first modulated-data signal and a second modulated data signal. The first modulated data signal includes the data signal modulated with the first carrier signal and the second modulated-data signal includes the data signal modulated with the second carrier signal. The method includes correlating the first modulated-data signal with the first carrier signal, to generate a first estimate signal of the data signal. The second modulated-data signal is correlated with the second carrier signal to generate a second estimate signal of the data signal. The first estimate signal and the second estimate signal are then combined for maximum signal-to-noise ratio to form a received-data signal.

The present invention further provides a multicarrier direct sequence spread spectrum system including a transmitter and a receiver. The transmitter includes a first multiplier for multiplying a data signal with a pseudo-random sequence to produce a first signal, a plurality of second multipliers, each coupled to the first signal and each respectively coupled to one of a plurality of first carrier signals, for producing a plurality of second signals, and a first signal summer, coupled to the plurality of second signals, for producing a third signal for transmission which is a sum of the second signals. According to the present invention, the plurality of first carrier signals are orthogonal to each other. The receiver includes a third multiplier for multiplying a received third signal with the pseudo-random sequence to produce a fourth signal, a plurality of correlators, each coupled to the fourth signal and each respectively coupled to one of a plurality of second carrier signals, to produce a plurality of fifth signals, and a maximal-ratio combiner coupled to the plurality of fifth signals for combining the plurality of fifth signals to produce a received data signal. The plurality of second carrier signals corresponds to the plurality of first carrier signals. Preferably, the plurality of correlators includes a plurality of fourth multipliers, each coupled to the fourth signal and each respectively coupled to one of the plurality of second carrier signals, to produce a plurality of sixth signals, and a plurality of integrators, each respectively coupled to one of the sixth signals, for integrating the sixth signals and producing the plurality of fifth signals.

In one embodiment of the present invention, the maximal-ratio combiner includes a plurality of amplifiers for amplifying each of the plurality of fifth signals to produce a plurality of seventh signals, such that each amplifier is coupled to a respective fifth signal for amplifying the respective fifth signal by a predetermined amount corresponding to the respective fifth signal to produce a corresponding seventh signal, and a second signal summer, coupled to the plurality of seventh signals, for producing the received data signal. Preferably, the respective predetermined amount that each fifth signal is amplified by is related to a fading parameter of the respective fifth signal divided by a variance of the noise of the respective fifth signal.

The present invention also provides for a method of modulating and demodulating a spread spectrum signal which includes the steps of direct-sequence processing a data signal with a spreading-sequence signal to form a spread-data signal, multiplying the spread-data signal by a plurality of carrier signals to form a plurality of first spread spectrum signals, where each carrier signal is orthogonal to each other carrier, combining the plurality of spread spectrum signals to form a multicarrier spread spectrum signal, despreading the multicarrier spread spectrum signal to form a plurality of modulated-data signals each having the data signal modulated by a corresponding carrier signal of the plurality of carrier signals, correlating the plurality of modulated-data signals with respective replicas of the plurality of carrier signals to form a corresponding plurality of estimate signals of the data signal, and combining the plurality of estimate signals for maximum signal-to-noise ratio to form a received-data signal. Preferably, the step of combining the plurality of estimate signals includes amplifying each estimate signal by a corresponding predetermined amount, where each corresponding predetermined amount is related to a fading parameter associated with a spread spectrum signal corresponding to a respective estimate signal divided by a variance of noise associated with the spread spectrum signal corresponding to the respective estimate signal.

Additional objects and advantages of the invention are set forth in part in the description which follows, and in part are obvious from the description, or may be learned by practice of the invention. The objects and advantages of the invention also may be realized and attained by the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Figure 1:
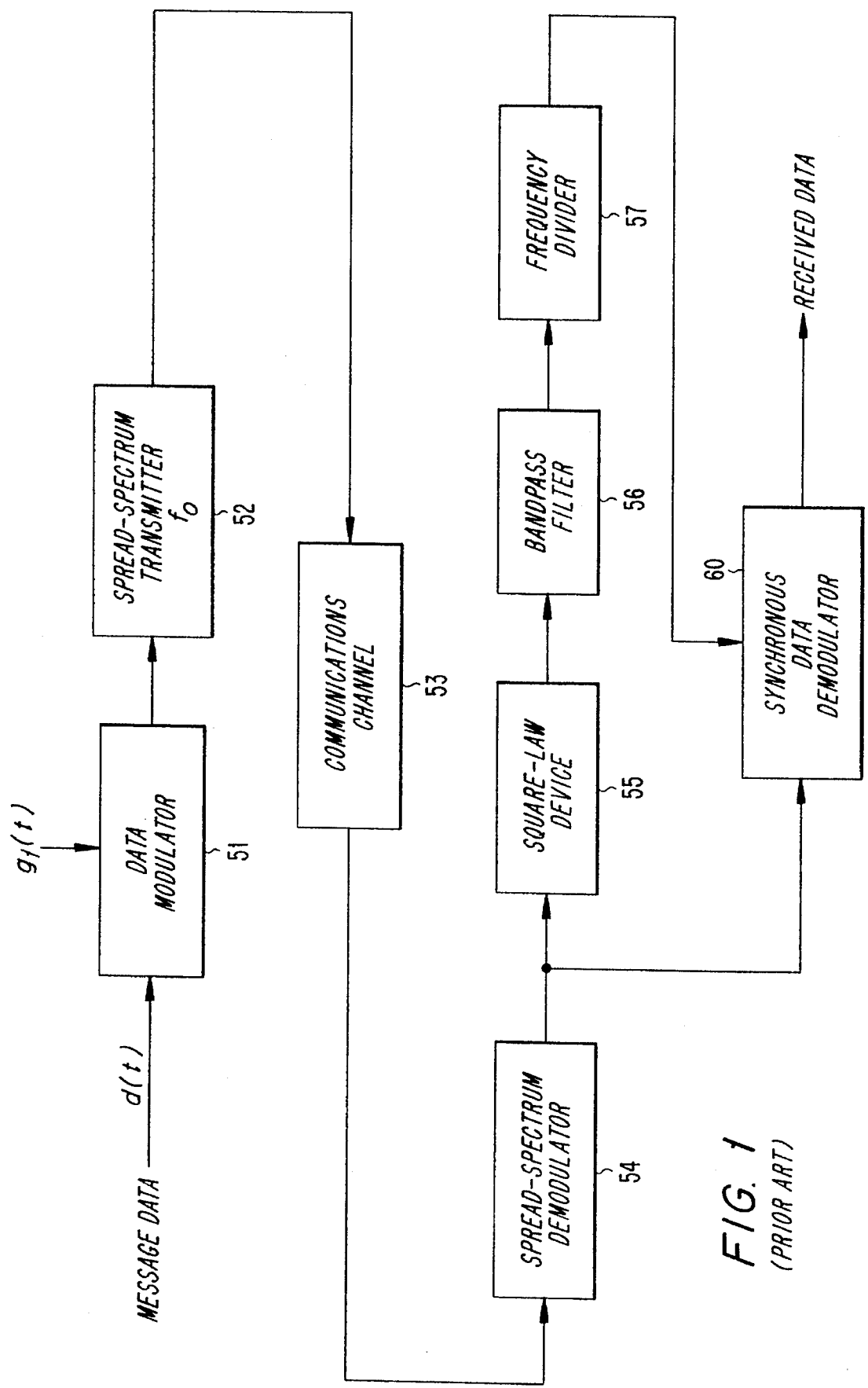
FIG. 1 is a prior art spread spectrum scheme for synchronously recovering message data.

Reference is now made in detail to the present preferred embodiments of the invention, examples of which are illustrated in the accompanying drawings, wherein like reference numerals indicate like elements throughout the several views.

The multicarrier direct sequence spread spectrum system and method of the present invention achieve multipath enhancement and narrowband interference suppression without using a RAKE tapped delay line or a notch filter. A plurality of carriers are used rather than a single carrier, as typically would be used for a RAKE or notch filter system.

The receiver provides a correlator for each carrier, and all the correlator outputs are combined by a maximal-ratio combiner to form a received data signal.

The present invention provides a new technique for direct sequence spread spectrum and this disclosure presents the results of a preliminary analysis of system performance. In particular, the multicarrier direct sequence spread spectrum system not only has a frequency diversity effect, but also exhibits narrow band interference suppression. The direct sequence spread spectrum signals may be overlaid onto an existing narrowband signal. To eliminate interference from the direct sequence spread spectrum signals experienced by a narrowband user, the multicarrier system can omit transmitting at the particular frequencies which occupy the spectrum used by the narrowband user. In this situation, there is no interference to existing microwave systems from CDMA signals, and there is no need for a notch filter at the transmitter of the spread spectrum system.

A spread spectrum system for transmitting a data signal over a communications channel comprises a transmitter and a receiver. The transmitter includes a direct-sequence processing means, a multiplying means, and a first combining means. The multiplying means is coupled between the direct-sequence processing means and the first combining means, and the first combining means is coupled to the communications channel.

The direct sequence processing means direct-sequence processes the data signal with a spreading-sequence signal to generate a spread-data signal. The multiplying means multiplies the spread-data signal with a plurality of carrier signals to generate a plurality of spread spectrum signals, respectively. Each carrier signal has a carrier frequency different from the carrier frequencies of other carrier signals of the plurality of carrier signals. Additionally, each carrier signal is orthogonal to each other carrier signal of the plurality of carrier signals.

Figure 3:
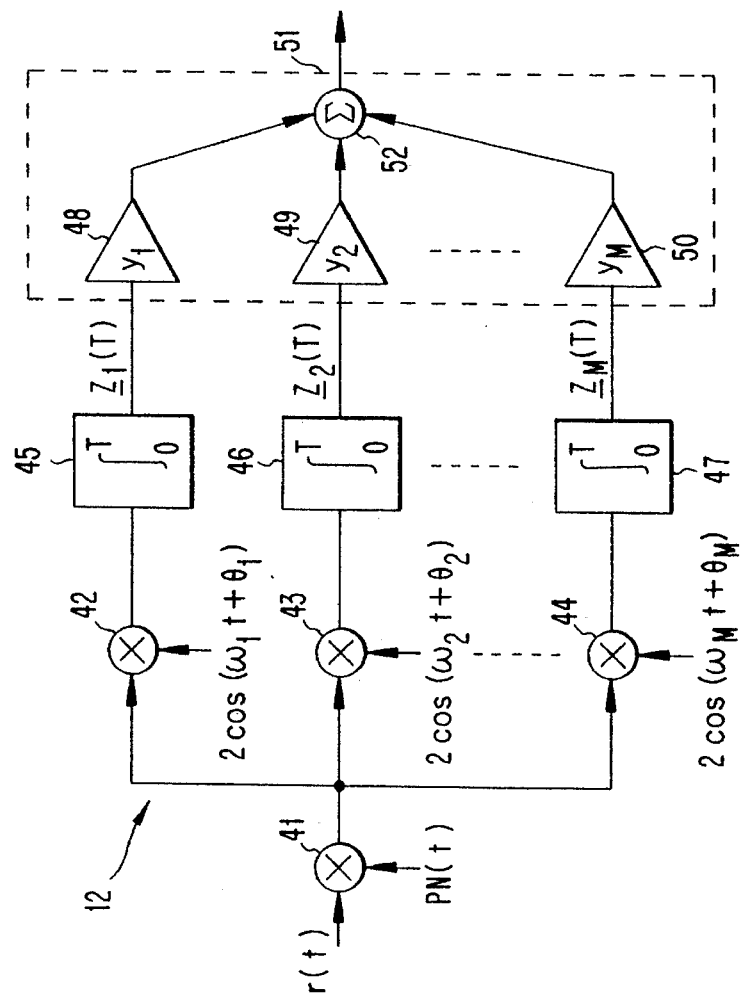
FIG. 3 is a block diagram of a multicarrier direct sequence spread spectrum system receiver according to the present invention.
Figure 2:
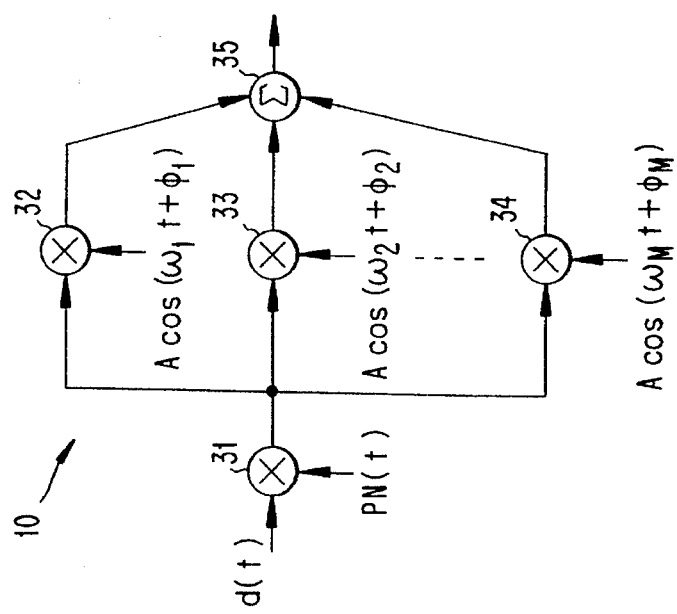
FIG. 2 is a block diagram of a multicarrier direct sequence spread spectrum system transmitter according to the present invention.

A multicarrier direct sequence spread spectrum system comprising a transmitter 10 and a receiver 12 is shown in FIGS. 2 and 3, respectively. This system has M carrier signals in the transmitter 10. In the receiver 12, M correlators are provided after despreading, and the correlator outputs are combined by a maximal-ratio combiner. The M carriers are designed to be orthogonal to each other. That is, $$\int_0^T \cos(\omega_i t + \phi_i)\cos(\omega_j t + \phi_j)dt = 0 \text{ for } i \neq j,$$

where T is the bit duration, and $\omega_i$ and $\omega_j$ are different carrier frequencies for $i \neq j$. Orthogonality is achieved by choosing $$\omega_i = m\frac{\pi}{T} + (i-1)n\frac{4\pi}{T} = m\frac{\pi}{T} + (i-1)\frac{4\pi}{T_c},$$

where m is an integer, n is the number of chips per bit, that is, the rate at which the bits of the data signal d(t) are chopped into chips, and $T_c$ is the chip duration.

The first combining means combines a plurality of spread spectrum signals to form a multicarrier spread spectrum signal, which is sent over a communications channel using suitable well-known techniques.

As illustratively shown in FIG. 2, transmitter 10 for the spread spectrum system, by way of example, includes a direct sequence processing means embodied as a spread spectrum processing device 31 such as a product device or EXCLUSIVE-OR gate, a multiplying means embodied as a plurality of product devices 32–34, and a first combining means embodied as the combiner 35. The plurality of product devices 32–34 is shown as a first product device 32, a second product device 33, through an $M^{th}$ product device 34. The product devices 32–34 are coupled between the spread spectrum processing device 31 and the combiner 35. The spread spectrum processing 31 device is coupled to a data source having a data signal d(t) and to a pseudonoise (PN) generating source having a spreading-sequence signal, PN(t). The output of combiner 35, r(t), is coupled to the communications channel.

The spread spectrum processing device 31 direct-sequence processes data signal d(t) with spreading-sequence signal PN(t) to generate a spread-data signal. Each of the plurality of product devices 32–34 multiplies the spread-data signal by a respective carrier signal. More particularly, the first product device 32 multiplies the spread-data signal by a first carrier signal, A cos ($\omega_1 t+\phi_1$), the second product device multiplies the spread-data signal by a second carrier signal, A cos($\omega_2 t+\phi_2$), through the $M^{th}$ product device which multiplies the spread-data signal by an $M^{th}$ carrier signal, A cos($\omega_M t+\phi_M$).

Accordingly, the first product device 32 generates a first spread spectrum signal. The second product device 33 generates a second spread spectrum signal. Similarly, the $M^{th}$ product device generates an $M^{th}$ spread spectrum signal.

Combiner 35 combines each of the spread spectrum signals output from the plurality of product devices 32–34. Thus, the first spread spectrum signal, the second spread spectrum signal and the $M^{th}$ spread spectrum signal are combined by combiner 35 to form a multicarrier spread spectrum signal which is sent from the combiner 35 over a communications channel. The transmitted multicarrier spread spectrum signal has a plurality of spread spectrum signals with each spread spectrum signal at a different carrier frequency where each carrier frequency is orthogonal to each other carrier frequency.

Referring to FIG. 3, receiver 12 includes a despreading means, a correlating means and a second combining means. The despreading means is coupled to the communications channel over which the multicarrier spread spectrum signal has been transmitted. The correlating means is coupled between the despreading means and the second combining means.

The despreading means despreads the multicarrier spread spectrum signal to form a signal having a plurality of modulated-data signals. Each modulated-data signal is modulated with a respective carrier signal of the plurality of carrier signals and integrated by the correlating means to produce a plurality of estimate signals of the data signal. The second combining means combines the plurality of estimate signals to form a received-data signal.

In the exemplary arrangement shown in FIG. 3, receiver 12 of the spread spectrum system has the despreading means embodied as a despreading device 41, the correlating means embodied as a plurality of correlators, and the second combining means embodied as a maximal-ratio combiner 51. The despreading device 41 is coupled to the communications channel over which the multicarrier spread spectrum signal has been transmitted. The plurality of correlators are each coupled between the despreading device 41 and the maximal-ratio combiner 51. The despreading device 41 may be a mixer, a product device, or an equivalent circuit well-known in the art for multiplying a received signal by a replica of the spreading-sequence signal used at transmitter 10.

The despreading device 41 despreads the multicarrier spread spectrum signal to form a plurality of modulated-data signals. The first spread spectrum signal, the second spread spectrum signal, through the $M^{th}$ spread spectrum signal, which are combined at the transmitter by combiner 35, are despread by despreading device 41 as a first modulated-data signal, a second modulated-data signal through an $M^{th}$ modulated-data signal, respectively. Each modulated data signal includes data modulated by a respective carrier signal. Thus, the first modulated-data signal has the data signal modulated with the first carrier signal. The second modulated-data signal has the data signal modulated with the second carrier signal. Similarly, the $M^{th}$ modulated-data signal has the data signal modulated with the $M^{th}$ carrier signal.

Each of the modulated-data signals is demodulated by a respective correlator of the plurality of correlators. The first correlator is shown as product device 42 coupled to an integrator 45. The second correlator is shown as product device 43 coupled to an integrator 46. Similarly, the $M^{th}$ correlator is shown as product device 44 coupled to an integrator 47. Each correlator correlates the respective modulated-data signals with the respective carrier signal. The first correlator decorrelates (or "multiplies and integrates") the first modulated data signal with the first carrier signal and outputs a first estimate signal of the data signal. The second correlator demodulates the second modulated-data signal with the second carrier signal and outputs a second estimate signal of the data signal. Likewise, the $M^{th}$ correlator demodulates the $M^{th}$ modulated-data signal with the $M^{th}$ carrier signal and outputs the $M^{th}$ estimate signal of the data signal.

While the despreading means and the correlating means are shown in FIG. 3 as the despreading device and plurality of correlators, equivalent circuitry may be used for accomplishing the same function. Matched filters may be used in a digital signal processor, or the disclosed circuitry may be embodied in an application specific integrated circuit (ASIC). Equivalently, surface acoustic wave (SAW) devices may be used at a respective carrier frequency for each of the respective spread spectrum signals, or at an intermediate frequency. Substitution of matched filters or SAW devices for the circuitry shown in FIG. 3 is readily understandable to those skilled in the art, and therefore is not described further.

The estimate signals are respectively coupled to amplifiers 48–50. That is, the first estimate signal produced by the first correlator is coupled to amplifier 48 having a gain $y_1$. The second estimate signal produced by the second correlator is coupled to amplifier 49 having gain $y_2$. Similarly, the $M^{th}$ estimate signal produced by the $M^{th}$ correlator is coupled to amplifier 50 having gain $y_M$.

Combiner 52 combines the outputs from the plurality of amplifiers 48–50. Accordingly, the respective outputs of the amplifiers 48–50 are combined by the maximal-ratio combining technique for maximum signal-to-noise (SNR) ratio to generate a received-data signal. That is, the respective gains of amplifiers 48–50 are adjusted to be related to a multipath fading parameter corresponding to each respective spread spectrum signal of the multicarrier spread spectrum signal divided by a variance of the noise associated with the respective spread spectrum signal. Maximal-ratio combiners are well-known to those skilled in the art and will be discussed below further in relation to the present invention.

The present invention also provides a method for transmitting a data signal over a communications channel using a multicarrier spread spectrum signal. The method includes the steps of direct-sequence processing the data signal with a spreading-sequence signal to generate a spread-data signal. The spread-data signal is then multiplied by a plurality of carrier signals at a plurality of carrier frequencies, respectively, to generate a plurality of spread spectrum signals. More particularly, the spread-data signal is multiplied by a first carrier signal at a first carrier frequency to generate a first spread spectrum signal. The spread-data signal is also multiplied by a second carrier signal at a second carrier frequency to generate a second spread spectrum signal. Similarly, the spread-data signal is multiplied by an $M^{th}$ carrier signal at an $M^{th}$ carrier frequency to generate an $M^{th}$ spread spectrum signal. Each carrier frequency is different from the other carrier frequencies. Accordingly, the second carrier frequency and $M^{th}$ carrier frequencies are different from the first carrier frequency, and the $M^{th}$ carrier frequency is different from the second carrier frequency. Additionally, each carrier frequency is orthogonal to the other carrier frequencies.

Each of the spread spectrum signals are combined to form a multicarrier spread spectrum signal. That is, the first spread spectrum signal, the second spread spectrum signal, through the $M^{th}$ spread spectrum signal are combined to form a multicarrier spread spectrum. The multicarrier spread spectrum signal is then transmitted over the communications channel using suitable well-known techniques.

The method includes the step of despreading the multicarrier spread spectrum signal to form a plurality of modulated-data signals. The plurality of modulated-data signals includes a first modulated-data signal, a second modulated-data signal through an $M^{th}$ modulated-data signal. As with the apparatus of the present invention, each modulated-data signal has the data signal modulated with a respective carrier signal. Thus, the first modulated-data signal has the data signal modulated with the first carrier signal, and the second modulated-data signal has the data signal modulated with the second carrier signal. Likewise, the $M^{th}$ modulated-data signal has the data signal modulated with the $M^{th}$ carrier signal.

The method for receiving the multi-carrier spread spectrum signal further includes the step of correlating each modulated-data signal with a replica of a corresponding carrier signal and outputting the respective results as a plurality of estimate signals. Each estimate signal is then combined with the other estimate signals for maximum SNR ratio to generate a received-data signal.

Referring to FIG. 2 and 3, in use, message data are spread spectrum processed by spread spectrum processing device 31, and modulated by a plurality of carrier signals by the plurality of product devices 32–34 and combined by combiner 35. The combined signal is a multicarrier spread spectrum signal which is sent over the communications channel. At the receiver, the despreading device 41 despreads the multicarrier spread spectrum signal to form a plurality of modulated-data signals. A plurality of correlators decorrelate the plurality of modulated-data signals as a plurality of estimate signals. The plurality of estimate signals are combined by maximal-ratio combiner 51 and output as a received-data signal.

If the multicarrier system causes interference to a user whose bandwidth coincides with the bandwidth of one of the carriers, then the multicarrier system can avoid transmitting on that particular carrier frequency. Performance with interference reduction according to the present invention is discussed below.

Performance of the Invention

Figure 4:
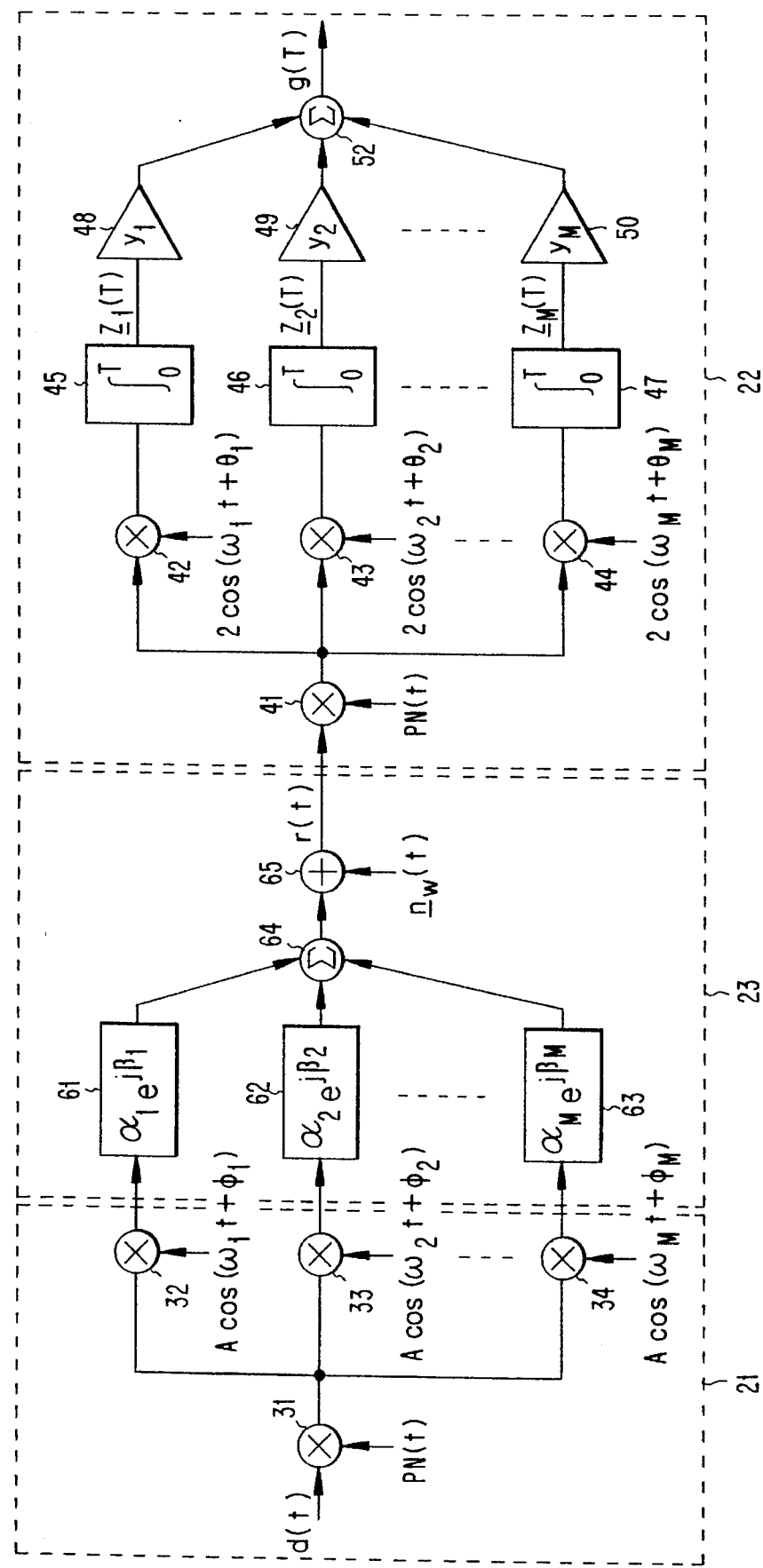
FIG. 4 is a system model of a multicarrier direct sequence spread spectrum system according to the present invention.

This section demonstrates the robustness of the multicarrier system and method to multipath fading. FIG. 4 shows a system model of a multicarrier direct sequence spread spectrum system which includes the effect of the channel communications, where the communications channel having receiver 21 and transmitter 23 has multipath fading parameters 61–63 associated with each carrier. The block diagram receiver portion 21 of FIG. 4 differs slightly from the receiver 10 of FIG. 2 for modelling convenience. That is, fading parameters 61–64 are shown as acting upon their associated spread spectrum signals prior to summation at 64 and noise $n_w(t)$ is added at 65 to obtain r(t). Parameters 61–63 include $\alpha_1$–$\alpha_M$ as respective fading coefficients and $\beta_1$–$\beta_M$ as respective phase angles of the respective parameters. As shown in FIG. 4, assume that the spread spectrum signal at each frequency band is fading nonselectively, but that separate bands fade independently of one-another. Then the received signal is given by $$r(t) = Ad(t)PN(t) \sum_{i=1}^{M} \alpha_i \cos(\omega_i t + \underline{\theta}_i) + \underline{n}_w(t),$$

where $\theta_i = \phi_i + \beta_i$, is a constant amplitude, d(t) is a random binary sequence representing the data, PN(t) is the spreading sequence, and $n_w(t)$ is additive white Gaussian noise with a double-sided power spectrum density of $\eta_o/2$. Further assume $\{\alpha_i, i=1, 2, ---, M\}$ are independent and identically distributed Rayleigh random variables and $\{\theta_i, i=1, 2, ---, M\}$ are independent and identically distributed uniform random variables over $(0, 2\pi)$. Assuming perfect carrier, code and bit synchronization, the following test statistic out of the $k^{th}$ correlator can be obtained:

$$\underline{Z}_k(T) = \pm A \sum_{i=1}^{M} \alpha_i \int_0^T \cos(\omega_i t + \underline{\theta}_i) \cdot 2\cos(\omega_k t + \underline{\theta}_k)dt + n_k(T)$$

$$= \pm A \alpha_k T + \underline{n}_k(T),$$

where $n_k(T) \sim N(0, \eta_o T)$. Then $$g(T) = \sum_{i=1}^{M} y_i(\alpha_i AT + \underline{n}_i(T)),$$

where $y_i$ is the gain of the $i^{th}$ branch of the receiver, and the signal-to-noise ratio, $\lambda$, is given by $$\lambda = \frac{A^2 T^2 \left( \sum_{i=1}^{M} y_i \alpha_i \right)^2}{2 \sum_{i=1}^{M} y_i^2 N_i}$$

where $N_i = \text{Var}(\underline{n}_i(T))$. As is well-known to those in the art, maximal-ratio combining, that is, setting $y_i = \alpha_i / N_i$ results in a conditional probability of error, $$P(e|\gamma_b) = \phi(-\sqrt{2\gamma_b}),$$

where $$\phi(x) = \frac{1}{\sqrt{2\pi}} \int_{-\infty}^{x} e^{\frac{t^2}{2}} dt$$

and $$\gamma_b = \frac{E_b}{\eta_o} \sum_{i=1}^{M} \alpha_i^2.$$

Note that $\gamma_b$ has a chi-square distribution. Thus, $$Pe = \int_0^{\infty} \phi(-\sqrt{2\gamma_b})f(\gamma_b)d\gamma_b$$

$$= \left( \frac{1-\mu}{2} \right)^M \sum_{i=0}^{M-1} \binom{M-1+i}{i} \left( \frac{1+\mu}{2} \right)^i,$$

where $$\mu \equiv \sqrt{\frac{\overline{\gamma_b}}{1+\overline{\gamma_b}}} \text{ and } \overline{\gamma_b} \equiv \frac{E_b}{\eta_o} E\{\alpha_i^2\}$$

The above equation is the well-known result for maximal-ratio combining. Thus, with the multicarrier receiver, performance similar to that obtained with a RAKE receiver is achieved by virtue of the frequency separation of the carriers.

Single Tone Interference

To provide a different perspective on the multicarrier system, the performance of the system when used over an additive white Gaussian noise (AWGN) channel in the presence of single tone interference is presented. The received signal is given by $$r(t) = Ad(t)PN(t) \sum_{i=1}^{M} \cos(\omega_i t + \theta_i) + \alpha \cos(\omega_J t + \theta_J) + \underline{n}_w(t),$$

where $\alpha$, $\omega_J$ and $\theta_J$ are the amplitude, the frequency and the phase of the jammer, respectively. Assuming again perfect carrier, code and bit synchronization, the test statistic out of the $k^{th}$ correlator is given by $$\underline{Z}_k(T) = \pm AT + I_k(T) + \underline{n}_k(T),$$

where $n_k(T) \sim N(0, \eta_o T)$, and $$I_k(T) = 2\alpha \int_0^T PN(t) \cos(\omega_k t + \theta_k) \cos(\omega_J t + \theta_J) dt.$$

Ignoring the double frequency term, $$I_k(T) = \alpha \sum_{i=0}^{n-1} c_i \int_{iT_c}^{(i+1)T_c} \cos[(\omega_k - \omega_J)t + \hat{\theta}_k] dt =$$

$$\alpha \sum_{i=0}^{n-1} c_i \frac{1}{\omega_k - \omega_J} \{\sin[(\omega_k - \omega_J)(i+1)T_c + \hat{\theta}_k] -$$

$$\sin[(\omega_k - \omega_J)iT_c + \hat{\theta}_k]\},$$

where $\{c_i\}$ represents the spreading sequence, and $\hat{\theta}_k = \theta_k - \theta_J$. $\omega_k$ can be written as $$\omega_k = \omega_1 + (k-1)\frac{4\pi}{T_c}.$$

Assuming the jammer is located in the $j^{th}$ frequency band of the system, $\omega_J$ can be represented by $$\omega_J = \omega_1 + (j-1)\frac{4\pi}{T_c} + p\frac{2\pi}{T_c},$$

where $-1 \leq p \leq 1$. Then, $$I_k(T) = \alpha T_c \frac{\sin(\pi p)}{\pi p - 2\pi(k-j)} \cdot \sum_{i=0}^{n-1} c_i \cos((2i+1)\pi p - \hat{\theta}_k).$$

If $\{C_i\}$ is assumed to be a random binary sequence, $I_k(T)$ can be approximated as being conditionally Gaussian, conditioned on $\hat{\theta}_k$, and the following conditional moments can be obtained:

$$E\{I_k(T)|\hat{\theta}_k\} = 0,$$

and $$\text{Var}\{I_k(T)|\hat{\theta}_k\} = \alpha^2 T_c^2 \left\{ \frac{\sin(\pi p)}{\pi p + 2\pi(j-k)} \right\}^2 \cdot$$

$$\sum_{i=0}^{n-1} \left\{ \frac{1}{2} + \frac{1}{2} \cos(4i\pi p + 2\pi p - 2\hat{\theta}_k) \right\}.$$

Using the following identity, $$\sum_{i=0}^{n-1} \cos(iy + x) = \frac{\cos\{x + [(n-1)/2]y\}\sin(ny/2)}{\sin(y/2)},$$

to obtain:

$$Var\{I_k(T)|\hat{\theta}_k\} = \alpha^2 \frac{T_c^2}{2} \left\{ \frac{\sin(\pi p)}{\pi p + 2\pi(j-k)} \right\}^2 \cdot$$

$$\left\{ n + \frac{\cos(2n\pi p - 2\hat{\theta}_k)\sin(2n\pi p)}{\sin(2\pi p)} \right\} \equiv \alpha^2 N_k;$$

$$\therefore Z_k(T) \sim N(\pm AT, \eta_o T + \alpha^2 N_k),$$

conditioned upon $\hat{\theta}_k$.

Assumed that the interfering sinusoidal tone represents unintentional narrowband interference, as opposed to intentional jamming, and further suppose that the tone is sufficiently stationary so that its power can be measured on each of the M branches of the receiver. Employing maximal-ratio combining gives $$g(T) = \sum_{i=1}^{M} y_i Z_i(T),$$

$$\text{where } y_i = \frac{AT}{Var\{Z_i\}}.$$

Thus, the test statistic has moments given by $$E\{g(T)|\bar{\theta}\} = \sum_{i=1}^{M} \frac{A^2 T^2}{\eta T + \alpha^2 N_i}$$

$$Var\{g(T)|\bar{\theta}\} = \sum_{i=1}^{M} \left( \frac{AT}{\eta_o T + \alpha^2 N_i} \right)^2 (\eta_o T + \alpha^2 N_i) =$$

$$\sum_{i=1}^{M} A^2 \frac{T^2}{\eta_o T + \alpha^2 N_i},$$

where $\bar{\theta} = (\hat{\theta}_1, \hat{\theta}_2, \cdots \hat{\theta}_M)$. Finally, we obtain $$P(e|\theta) = \phi \left( \sqrt{\sum_{i=1}^{M} \left( \frac{\eta_o}{2E_b} + \frac{\alpha^2}{A^2} \frac{N_i}{T^2} \right)^{-1}} \right) =$$

$$\phi \left( -\sqrt{\sum_{i=1}^{M} \left\{ M \left( \frac{\eta_o}{2E} + ISR \frac{N_i}{T^2} \right) \right\}^{-1}} \right),$$

where $E_b$ is the energy per symbol of each branch of the receiver, and $$ISR = \frac{\alpha^2/2}{MA^2/2}.$$

Note that E is the total energy per symbol of the transmitted waveform and $E = ME_b$. Similarly, $MA^2/2$ is the total signal power.

Numerical Results

A. Frequency Diversity Effect

Figure 5:
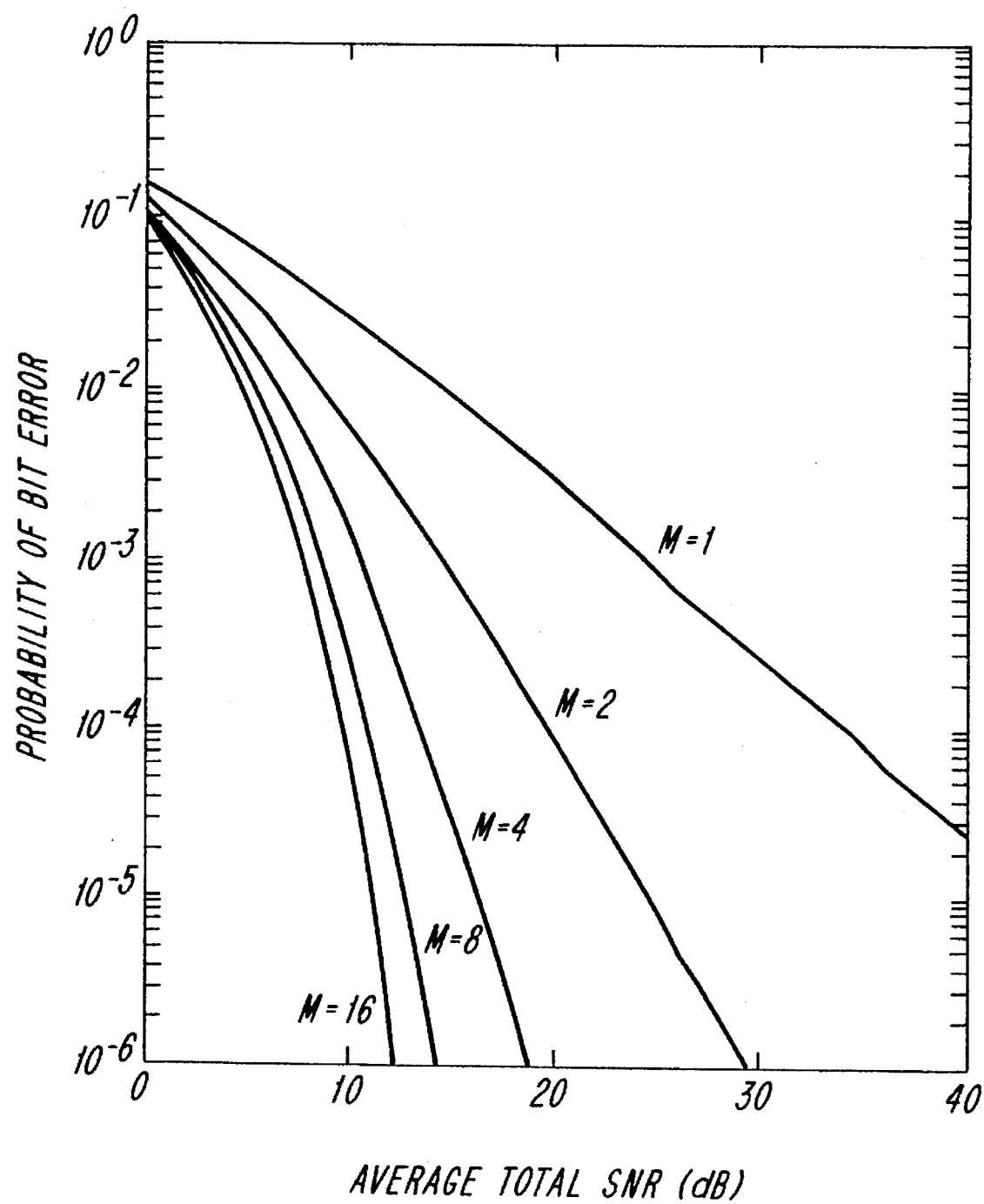
FIG. 5 illustrates performance of the present invention over a Rayleigh fading channel.

FIG. 5 shows the bit error rate (BER) performance of this system, when used over a frequency selective Rayleigh channel, as a function of average total symbol energy $\gamma$. Note that $\gamma_b$ is the average symbol energy per receiver branch, and $\gamma = M\gamma_b$, where M is the number of branches. It is seen that a frequency diversity effect is being achieved.

B. Tone Interference Suppression Effect

To obtain the worst-case error probability, set $\theta_k = n\pi p/2$ for all k; then $N_k$ is given by $$N_k = \frac{T_c^2}{2} \left\{ \frac{\sin(\pi p)}{\pi p + 2\pi(j-k)} \right\}^2 \left\{ n + \frac{\sin(2n\pi p)}{\sin(2\pi p)} \right\}.$$

Figure 6:
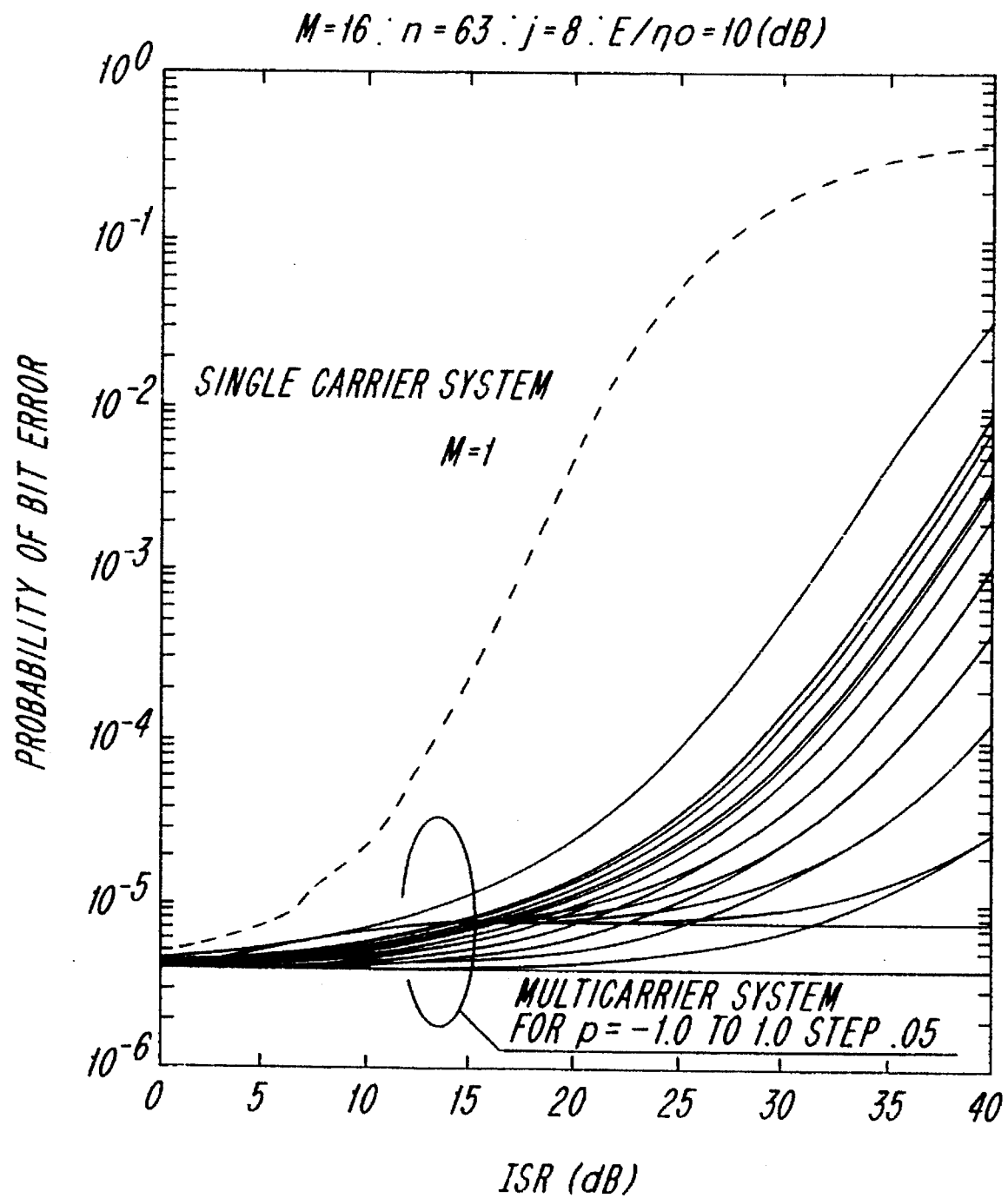
FIG. 6 illustrates the tone interference suppression effect for a first set of parameters.
Figure 7:
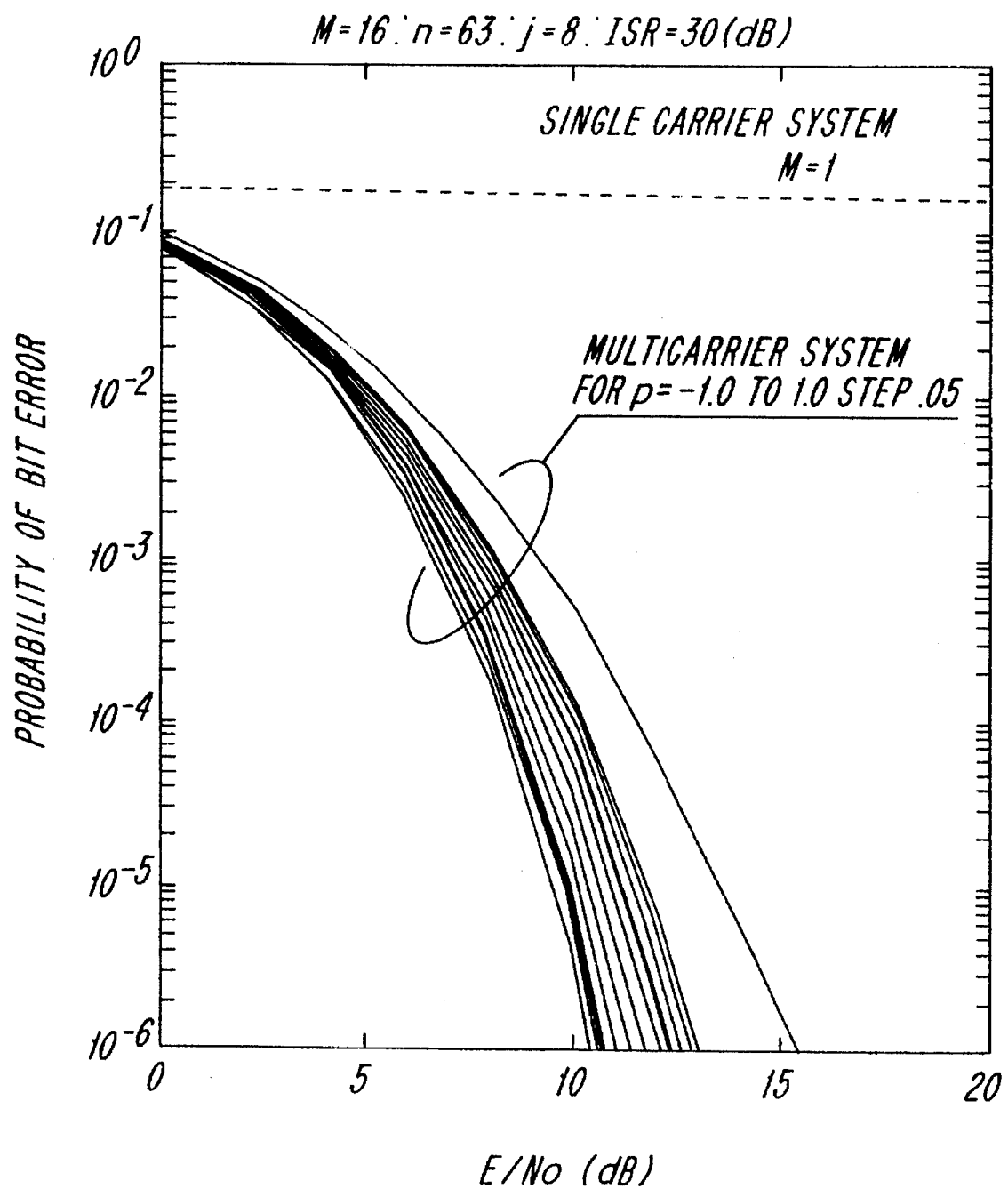
FIG. 7 illustrates the tone interference suppression effect for a second set of parameters.

Some representative performance curves of the system for various $\alpha$ and $\omega_j$ are shown in FIG. 6 and FIG. 7. Solid lines are the BER of the multicarrier system, and dashed lines are that of a single carrier system which has the same bandwidth as the multicarrier system. This implies that the processing gain of the single carrier system is nM, and its performance is given by $$P(e|\theta = 0) = \phi \left( -\frac{1}{\sqrt{\frac{\eta_o}{2E} + \frac{ISR}{nM}}} \right),$$

where $\omega_j$ is equal to the carrier frequency of the system.

It will be apparent to those skilled in the art that various modifications can be made to the multicarrier direct sequence spread spectrum system and method of the instant invention without departing from the scope or spirit of the invention, and it is intended that the present invention cover modifications and variations of the multicarrier direct sequence spread spectrum system and method provided they come within the scope of the appended claims and their equivalents.

What is claimed is:

1. A spread spectrum system for transmitting a data signal over a communications channel, comprising:

a transmitter including,
   a spread spectrum processing device for direct-sequence processing the data signal with a spreading-sequence signal to generate a spread-data signal;
   a first product device, electrically coupled to the spread spectrum processing device, for multiplying the spread-data signal with a first carrier signal to generate a first spread spectrum signal;
   a second product device, electrically coupled to the spread spectrum processing device, for multiplying the spread-data signal with a second carrier signal to generate a second spread spectrum signal, the second carrier signal having a frequency different from a frequency of the first carrier signal and the second carrier signal orthogonal to the first carrier signal;
   a combiner, electrically coupled to the first product device and the second product device, for combining the first spread spectrum signal and the second spread spectrum signal to form a multicarrier spread spectrum signal over the communications channel; and a receiver including,
   a despreading device, electrically coupled to the communications channel, for despreading the multicarrier spread spectrum signal to form a first modulated-data signal and a second modulated-data signal, the first modulated-data signal including the data signal modulated with the first carrier signal and the second modulated-data signal including the data signal modulated with the second carrier signal;
   a first correlator, electrically coupled to the despreading device, for correlating the first modulated-data signal with a replica of the first carrier signal and for outputting a first estimate signal of the data signal;
   a second correlator, electrically coupled to the despreading device, for correlating the second modulated-data signal with a replica of the second carrier signal and for outputting a second estimate signal of the data signal; and a maximal-ratio combiner, electrically coupled to the first correlator and the second correlator, for combining the first estimate signal and the second estimate signal for maximum signal-to-noise ratio to form a received data signal.

2. The spread spectrum system according to claim 1, the transmitter further including, a third product device electrically coupled to the spread spectrum processing device for multiplying the spread-data signal with a third carrier signal to generate a third spread spectrum signal, the third carrier signal different from both the frequency of the first carrier signal and the frequency of the second carrier signal and the third carrier signal orthogonal to both the first carrier signal and the second carrier signal;

the combiner electrically coupled to the third product device for combining the third the second spread spectrum signal to form the multicarrier spread spectrum signal and for transmitting the multicarrier spread spectrum signal over the communications channel; and wherein the receiver further includes, the despreading device for despreading the multicarrier spread spectrum signal to form a third modulated-data signal having the data signal modulated with the third carrier signal;

a third correlator, electrically coupled to the despreading device for correlating the third modulated-data signal with a replica of the third carrier signal and for outputting a third estimate signal of the data signal; and the maximal-ratio combiner is electrically coupled to the third correlator for combining the third estimate signal with the first estimate signal and the second estimate signal for maximum signal-to-noise ratio to form the received-data signal.

3. A spread spectrum system for transmitting a data signal over a communications channel, comprising:

a transmitter including, means for direct-sequence processing the data signal with a spreading-sequence signal for generating a spread-data signal, means for multiplying the spread-data signal with a plurality of carrier signals and for generating a corresponding plurality of spread spectrum signals, each of the plurality of carrier signals having a carrier frequency different from carrier frequencies of other carrier signals of the plurality of carrier signals and each of the plurality of carrier signals being orthogonal to the other carrier signals of the plurality of carrier signals, first means for combining the plurality of spread spectrum signals to form a multicarrier spread spectrum signal; and a receiver including, means for despreading the multicarrier spread spectrum signal to form a plurality of modulated-data signals, each of the plurality of modulated-data signals modulated by a respective carrier signal of the plurality of carrier signals, means for correlating the plurality of modulated-data signals with a plurality of replica carrier signals, respectively, and for outputting a plurality of estimate signals corresponding to the plurality of modulated-data signals; and second means for combining the plurality of estimate signals to form a received-data signal.

4. The spread spectrum system according to claim 3, wherein, the direct-sequence processing means includes a spread spectrum processing device for direct-sequence processing the data signal with a spreading-sequence signal for generating the spread-data signal; and the multiplying means includes, a first product device, electrically coupled to the spread spectrum processing device, for multiplying the spread-data signal with a first carrier signal and for generating a first spread spectrum signal, and a second product device, electrically coupled to the spread spectrum processing device, for multiplying the spread-data signal with a second carrier and for generating a second spread spectrum signal, the second carrier signal having a frequency different from a frequency of the first carrier signal and the second carrier signal orthogonal to the first carrier signal.

5. The spread spectrum system according to claim 4 wherein, the despreading means includes a despreading device electrically coupled to the communications channel, for despreading the multicarrier spread spectrum signal to form a first modulated-data signal having the data signal modulated with the first carrier signal, and a second modulated-data signal having the data signal modulated with the second carrier signal;

the correlating means includes, a first correlator, electrically coupled to the despreading device, for correlating the first modulated-data signal with a replica of the first carrier signal for outputting a first estimate signal of the data signal, and a second correlator, electrically coupled to the despreading device, for correlating the second modulated-data signal with a replica of the second carrier signal for outputting a second estimate signal of the data signal; and the second combining means includes a maximal ratio combiner, electrically coupled to the first correlator and the second correlator for combining the first estimate signal and the second estimate signal for maximum signal-to-noise ratio to form the received-data signal.

6. The spread spectrum system according to claim 5, wherein the multiplying means includes a third product device, electrically coupled to the spread spectrum processing device, for multiplying the spread-data signal with a third carrier signal and for generating a third spread spectrum signal, the third carrier signal having a frequency different from the frequency of both the first carrier signal and the second carrier signal and the third carrier signal orthogonal to both the first carrier signal and the second carrier signal; and the first combining means, further electrically coupled to the third product device, for combining the third spread spectrum signal with the first spread spectrum signal and the second spread spectrum signal to form the multicarrier spread spectrum signal and for transmitting the multicarrier spread spectrum signal over the communications channel.

7. The spread spectrum system according to claim 6, wherein the despreading means includes a despreading device electrically coupled to the communications channel, for despreading the multicarrier spread spectrum signal as the first modulated-data signal, the second modulated-data signal and a third modulated-data signal, with the third modulated-data signal having the data signal modulated with the third carrier signal;

the correlating means includes a third correlator, electrically coupled to the despreading device, for correlating the third modulated-data signal with a replica of the third carrier signal for outputting a third estimate signal of the data signal; and the maximal-ratio combiner, further electrically coupled to the third correlator, for combining the first estimate signal, the second estimate signal, and the third estimate signal for maximum signal-to-noise ratio to form the received-data signal.

8. A method for transmitting a data signal over a communications channel, comprising the steps of:

direct-sequence processing the data signal with a spreading-sequence signal to form a spread-data signal;

multiplying the spread-data signal by a first carrier signal to form a first spread spectrum signal;

multiplying the spread-data signal by a second carrier signal to form a second spread spectrum signal, the second carrier signal having a frequency different from a frequency of the first carrier signal and the second carrier signal being orthogonal to the first carrier signal;

combining the first spread spectrum signal and the second spectrum signal to form a multicarrier spread spectrum signal;

despreading the multicarrier spread spectrum signal to form a first modulated-data signal, with the first modulated-data signal having the data signal modulated by the first carrier signal, and a second modulated-data signal, with the second modulated-data signal having the data signal modulated by the second carrier signal;

correlating the first modulated-data signal with a replica of the first carrier signal to form a first estimate signal of the data signal;

correlating the second modulated-data signal with a replica of the second carrier signal to form a second estimate signal of the data signal; and combining the first estimate signal and the second estimate signal for maximum signal-to-noise ratio to form a received-data signal.

9. The method according to claim 8, wherein the step of combining the first estimate signal and the second estimate signal includes the steps of:

amplifying the first estimate signal by a first predetermined amount, the first predetermined amount related to a fading parameter associated with the first spread spectrum signal divided by a variance of a noise associated with the first spread spectrum signal; and amplifying the second estimate signal by a second predetermined amount, the second predetermined amount related to a fading parameter associated with the second spread spectrum signal divided by a variance of a noise associated with the second spread spectrum signal.

10. A multicarrier direct sequence spread spectrum system comprising:

a transmitter including, a first multiplier for multiplying a data signal with a pseudo-random sequence to produce a first signal, a plurality of second multipliers, each of said plurality of second multipliers for receiving the first signal and each of said plurality of second multipliers for receiving a respective one of a plurality of first carrier signals, for producing a plurality of second signals, and a first signal summer, for receiving the plurality of second signals, and for summing the plurality of second signals to produce a third signal for transmission; and a receiver including, a third multiplier for multiplying a received third signal with the pseudo-random sequence to produce a fourth signal, a plurality of correlators, each for receiving the fourth signal and a respective one of a plurality of second carrier signals, to produce a plurality of fifth signals, the plurality of second carrier signals, corresponding to the plurality of first carrier signals, and a maximal ratio combiner for receiving the plurality of fifth signals and for combining the plurality of fifth signals to produce a received data signal.

11. The system according to claim 10, wherein the plurality of correlators comprises:

a plurality of fourth multipliers, each of said plurality of fourth multipliers for receiving the fourth signal and each of said plurality of fourth multipliers for receiving a respective one of the plurality of second carrier signals, to produce a plurality of sixth signals; and a plurality of integrators, each of said plurality of integrators for receiving a respective one of the plurality of sixth signals, for integrating the plurality of sixth signals and for producing the plurality of fifth signals.

12. The system according to claim 10, wherein the plurality of first carrier signals are orthogonal to each other.

13. The system according to claim 10, wherein the maximal ratio combiner comprises:

a plurality of amplifiers for amplifying the plurality of fifth signals to produce a plurality of seventh signals, each of said plurality of amplifiers for receiving a respective one of the plurality of fifth signals and for amplifying the respective fifth signal by a predetermined amount corresponding to the respective fifth signal to produce a corresponding seventh signal; and a second signal summer, for receiving the plurality of seventh signals, and for producing the received data signal.

14. The system according to claim 13, wherein the respective predetermined amount by which each fifth signal is amplified is related to a fading parameter of the respective fifth signal divided by a variance of a noise of the respective fifth signal.

15. A multicarrier direct sequence spread spectrum transmitter for simultaneously transmitting a plurality of spread spectrum waveforms comprising:

a first multiplier for multiplying a data signal with a user-specific pseudo-random sequence to produce a first signal;

a plurality of second multipliers, each of said plurality of second multipliers for receiving the first signal and each of said plurality of second multipliers for receiving, simultaneously with other multipliers of said plurality of second multipliers, a respective one of a plurality of carrier signals, each of said plurality of carrier signals having a frequency different from and orthogonal to a frequency of any other carrier signal in the plurality of carrier signals, for producing a plurality of second signals; and a signal summer, for receiving the plurality of second signals, and for summing the plurality of second signals to produce a third signal for transmission.

16. A multicarrier direct sequence spread spectrum receiver for receiving a plurality of simultaneously transmitted spread spectrum waveforms comprising:

a first multiplier for multiplying a received first signal with a user-specific pseudo-random sequence to produce a second signal;

a plurality of correlators, each of said plurality of correlators for receiving the second signal and each of said plurality of correlators for receiving, simultaneously with other correlators of said plurality of correlators, a respective one of a plurality of carrier signals, each of said plurality of carrier signals having a frequency different from a frequency of any other carrier signal in the plurality of carrier signals, to produce a plurality of third signals; and a maximal ratio combiner for receiving the plurality of third signals and for combining the plurality of third signals to produce a received data signal.

17. A multicarrier direct sequence spread spectrum receiver comprising:

a first multiplier for multiplying a received first signal with a pseudo-random sequence to produce a second signal;

a plurality of correlators, each of said plurality of correlators for receiving the second signal and each of said plurality of correlators for receiving a respective one of a plurality of carrier signals, each of said plurality of carrier signals having a frequency different from a frequency of any other carrier signal in the plurality of carrier signals, to produce a plurality of third signals, the plurality of correlators further comprising:

a plurality of second multipliers, each of said plurality of second multipliers for receiving the second signal and each of said plurality of second multipliers for receiving a respective one of the plurality of carrier signals, to produce a plurality of fourth signals; and a plurality of integrators, each of said plurality of integrators for receiving a respective one of the plurality of fourth signals, for integrating the plurality of fourth signals and for producing the plurality of third signals; and a maximal ratio combiner for receiving the plurality of third signals and for combining the plurality of third signals to produce a received data signal.

18. The receiver according to claim 17 with each of the plurality of carrier signals being orthogonal to every other carrier signal in the plurality of carrier signals.

19. A multicarrier direct sequence spread spectrum receiver comprising:

a first multiplier for multiplying a received first signal with a user-specific pseudo-random sequence to produce a second signal;

a plurality of correlators, each of said plurality of correlators for receiving the second signal and each of said plurality of correlators for receiving a respective one of a plurality of carrier signals, each of said plurality of carrier signals having a frequency different from a frequency of any other carrier signal in the plurality of carrier signals, to produce a plurality of third signal; and a maximal ratio combiner for receiving the plurality of third signals and for combining the plurality of third signals to produce a received data signal, the maximal ratio combiner including a plurality of amplifiers for amplifying the plurality of third signals to produce a plurality of fifth signals, each of said plurality of amplifiers for receiving a respective one of the plurality of third signals and for amplifying the respective third signal by a predetermined amount corresponding to the respective third signal to produce a corresponding fifth signal; and a signal summer, for receiving the plurality of fifth signals, and for producing the received data signal.

20. The system according to claim 19, wherein the predetermined amount by which each third signal is amplified is related to a fading parameter of the respective third signal divided by a variance of a noise of the respective third signal.

21. A method for modulating and demodulating a spread spectrum signal, comprising the steps of:

direct-sequence processing a data signal with a spreading-sequence signal to form a spread-data signal;

multiplying the spread-data signal by a plurality of carrier signals to form a plurality of spread spectrum signals, each of said plurality of carrier signals being orthogonal to other carrier signals, in said plurality of carrier signals;

combining the plurality of spread spectrum signals to form a multicarrier spread spectrum signal;

despreading the multicarrier spread spectrum signal to form a plurality of modulated-data signals, each of said plurality of modulated-data signals having the data signal modulated by a corresponding carrier signal of the plurality of carrier signals;

correlating the plurality of modulated-data signals with respective replicas of the plurality of carrier signals to form a corresponding plurality of estimate signals of the data signal; and combining the plurality of estimate signals for maximum signal-to-noise ratio to form a received-data signal.

22. The method according to claim 21, wherein the step of combining the plurality of estimate signals includes amplifying each of said plurality of estimate signals by a corresponding predetermined amount, each corresponding predetermined amount being related to a fading parameter associated with a spread spectrum signal corresponding to a respective estimate signal divided by a variance of a noise associated with the spread spectrum signal corresponding to the respective estimate signal.

23. A transmitter for transmitting a data signal over a communications channel, comprising:

a spread spectrum processing device for direct-sequence processing the data signal with a spreading-sequence signal and generating a spread-data signal;

a first product device, electrically coupled to the spread spectrum processing device, for multiplying the spread-data signal with a first carrier signal to generate a first spread spectrum signal;

a second product device, electrically coupled to the spread spectrum processing device, for multiplying the spread-data signal with a second carrier signal to generate a second spread spectrum signal, the second carrier signal having a frequency different from a frequency of the first carrier signal and the second carrier signal orthogonal to the first carrier signal; and a combiner electrically coupled to the first product device and the second product device, for combining the first spread spectrum signal and the second spread spectrum signal to form a multicarrier spread spectrum signal and for transmitting the multicarrier spread spectrum signal over the communications channel.

24. The transmitter according to claim 23, further comprising:
- a third product device, electrically coupled to the spread spectrum processing device for multiplying the spread-data signal with a third carrier signal to generate a third spread spectrum signal, the third carrier signal having a frequency different from both the frequency of the first carrier signal and the second carrier signal and the third carrier signal orthogonal to both the first carrier signal and the second carrier signal; and
- wherein the combiner is electrically coupled to the third product device for combining the third spread spectrum signal with the first spread spectrum signal and the second spread spectrum signal to form the multicarrier spread spectrum signal and for transmitting the multicarrier spread spectrum signal over the communications channel.

25. A receiver for receiving a data signal over a communications channel, comprising:
- a despreading device, electrically coupled to the communications channel, for despreading a multicarrier spread spectrum signal to form a first modulated-data signal and a second modulated-data signal, the first modulated-data signal including the data signal modulated with a first carrier signal and the second modulated-data signal including the data signal modulated with a second carrier signal, the second carrier signal having a frequency different from a frequency of the first carrier signal and the second carrier signal orthogonal to the first carrier signal;
- a first correlator, electrically coupled to the despreading device, for correlating the first modulated-data signal with a replica of the first carrier signal and for outputting a first estimate signal of the data signal;
- a second correlator, electrically coupled to the despreading device, for correlating the second modulated-data signal with a replica of the second carrier signal and for outputting a second estimate signal of the data signal; and
- a maximal-ratio combiner, electrically coupled to the first correlator and the second correlator, for combining the first estimate signal and the second estimate signal for maximum signal-to-noise ratio to form a received data signal.

26. The receiver according to claim 25, wherein,
- the despreading device for despreading the multicarrier spread spectrum signal to form a third modulated-data signal having the data signal modulated with a third carrier signal;
- a third correlator, electrically coupled to the despreading device, for correlating the third modulated-data signal with a replica of the third carrier signal and for outputting a third estimate signal of the data signal; and
- the maximal-ratio combiner, electrically coupled to the third correlator, for combining the third estimate signal with the first estimate signal and the second estimate signal for maximum signal-to-noise ratio to form the received-data signal.

27. A method for modulating a spread spectrum signal using a user-specific spreading sequence and for transmitting said spread spectrum signal using spectrum occupied by a narrowband user, with the narrowband user occupying a particular narrowband frequency, comprising the steps of:
- direct-sequence processing a data signal with a user-specific spreading-sequence signal to form a spread-data signal;
- multiplying the spread-data signal by a plurality of carrier signals to form a plurality of spread spectrum signals, each of said plurality of carrier signals having a frequency different from a frequency of any other carrier signal of said plurality of carrier signals and each of said plurality of carrier signals being orthogonal to other carrier signals of the plurality of carrier signals; and
- combining the plurality of spread spectrum signals to form a multicarrier-spread-spectrum signal;
- transmitting simultaneously the multicarrier-spread-spectrum signal using the spectrum other than the particular-narrowband frequency occupied by the narrowband user.

28. A method for demodulating a spread spectrum signal comprising the steps of:
- despreading a multicarrier spread spectrum signal to form a plurality of modulated-data signals, each of said plurality of modulated-data signals having a data signal modulated by a corresponding carrier signal of a plurality of carrier signals, with each of said plurality of carrier signals having a frequency different from a frequency of any other carrier signal of said plurality of carrier signals and each of said plurality of carrier signals being orthogonal to other carrier signals in the plurality of carrier signals;
- correlating the plurality of modulated-data signals with respective replicas of the plurality of carrier signals to form a corresponding plurality of estimate signals of the data signal;
- combining the plurality of estimate signals for maximum signal-to-noise ratio to form a received-data signal, the step of combining including the step of amplifying each of said plurality of estimate signals by a corresponding predetermined amount, each corresponding predetermined amount being related to a fading parameter associated with a spread spectrum signal corresponding to a respective estimate signal divided by a variance of a noise associated with the spread spectrum signal corresponding to the respective estimate signal.

* * * * *

UNITED STATES PATENT AND TRADEMARK OFFICE
CERTIFICATE OF CORRECTION

PATENT NO. : 5,521,937
DATED : May 28, 1996
INVENTOR(S) : Shiro Kondo, et. al.

It is certified that error appears in the above-indentified patent and that said Letters Patent is hereby corrected as shown below:

```
Column 8, line 55:   after "system" insert --having
                     receiver 21 and transmitter 22--;
                     before "channel" insert
                     --communications--; and after
                     "channel" insert --23--;
          line 56:   delete "communications" and delete
                     "having"; and
          line 57:   delete "receiver 21 and transmitter".
Column 9, line  6:   before "is a constant amplitude"
                     insert --A--.
```

Signed and Sealed this

Eleventh Day of February, 1997

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,521,937
DATED : May 28, 1996
INVENTOR(S) : Shiro Kondo and Laurence B. Milstein It is certified that error appears in the above-identified patent and that said Letters Patent is hereby corrected as shown below:

Title page, item [73], Assignee:

After --InterDigital Technology Corporation, Wilmington, Del." insert --; Fuji Electric Co., Ltd., Kawasaki, Japan--.

Signed and Sealed this

Twenty-eighth Day of October, 1997

Attest:

BRUCE LEHMAN

Attesting Officer

Commissioner of Patents and Trademarks